US012061254B2

(12) United States Patent
Dvorsky et al.

(10) Patent No.: US 12,061,254 B2
(45) Date of Patent: Aug. 13, 2024

(54) MICROWAVE IMAGING USING A RADIALLY-POLARIZED PROBE

(71) Applicant: The Curators of the University of Missouri, Columbia, MO (US)

(72) Inventors: Matthew Dvorsky, Rolla, MO (US); Mohammed Tayeb Al Qaseer, Rolla, MO (US); Reza Zoughi, Wildwood, MO (US)

(73) Assignee: THE CURATORS OF THE UNIVERSITY OF MISSOURI, Columbia, MO (US)

( * ) Notice: Subject to any disclaimer, the term of this patent is extended or adjusted under 35 U.S.C. 154(b) by 421 days.

(21) Appl. No.: 17/438,798

(22) PCT Filed: Mar. 27, 2020

(86) PCT No.: PCT/US2020/025433
§ 371 (c)(1),
(2) Date: Sep. 13, 2021

(87) PCT Pub. No.: WO2020/205606
PCT Pub. Date: Oct. 8, 2020

(65) Prior Publication Data
US 2022/0146663 A1 May 12, 2022

Related U.S. Application Data

(60) Provisional application No. 62/828,255, filed on Apr. 2, 2019.

(51) Int. Cl.
*G01S 13/90* (2006.01)
*G01S 7/02* (2006.01)

(52) U.S. Cl.
CPC .......... *G01S 13/9076* (2019.05); *G01S 7/026* (2013.01); *G01S 13/9027* (2019.05); *G01S 13/9056* (2019.05)

(58) Field of Classification Search
CPC .. G01S 13/9076; G01S 7/026; G01S 13/9027; G01S 13/9056
See application file for complete search history.

(56) References Cited

U.S. PATENT DOCUMENTS

| | | | |
|---|---|---|---|
| 5,760,397 A | 6/1998 | Huguenin et al. | |
| 8,059,268 B2 | 11/2011 | Judell et al. | |
| 8,319,678 B2 | 12/2012 | Weiss | |
| 2009/0237092 A1* | 9/2009 | Zoughi | G01S 13/89 324/637 |

(Continued)

FOREIGN PATENT DOCUMENTS

| | | | | |
|---|---|---|---|---|
| CN | 107144950 A | * | 9/2017 | ......... G02B 19/0076 |
| CN | 107247264 A | * | 10/2017 | ............. G01S 13/89 |
| WO | 2018/115372 A1 | | 6/2018 | |

OTHER PUBLICATIONS

S. Quabis, R. Dorn, J. Muller, G. K. Rurimo and G. Leuchs, "Radial polarization minimizes focal spot size," International Quantum Electronics Conference, 2004. (IQEC)., San Francisco, CA, USA, 2004, pp. 615-616, doi: 10.1364/IQEC.2004.IWG3. (Year: 2004).*

(Continued)

*Primary Examiner* — Bernarr E Gregory
(74) *Attorney, Agent, or Firm* — Stinson LLP

(57) ABSTRACT

A microwave and millimeter wave imaging system. In either a far-field or a near-field detection mode, a radially-polarized probe transmits an imaging signal along a predetermined scan path to detect a target in a sample. The imaging signal's orientation is independent of the target's orientation and changes at each target as the probe transmits the signal during scanning. A measurement system receives scattered waves reflected from the sample via a single channel and images the sample and the target based on the reflected waves independent of the orientation of the target.

20 Claims, 7 Drawing Sheets

(56) References Cited

U.S. PATENT DOCUMENTS

| | | | |
|---|---|---|---|
| 2009/0251771 A1 | 10/2009 | Hendriks et al. | |
| 2013/0027244 A1* | 1/2013 | Babakhani | G01S 13/89 342/179 |
| 2014/0062792 A1* | 3/2014 | Schantz | G01S 13/878 342/451 |
| 2016/0077055 A1* | 3/2016 | Corum | G01S 13/885 73/627 |
| 2016/0077203 A1* | 3/2016 | Corum | G01S 13/0218 342/175 |
| 2016/0079645 A1* | 3/2016 | Corum | G01S 13/0218 333/240 |
| 2016/0079754 A1* | 3/2016 | Corum | H02J 3/00 333/248 |

OTHER PUBLICATIONS

International Search Report and Written Opinion, International Application No. PCT/US2020/025433, Dated Jun. 19, 2020, 13 pages.

Yurduseven, Okan et al. Millimeter-wave spotlight imager using dynamic holographic metasurface antennas. Optics Express vol. 25. Jul. 24, 2017. Retrieved Sep. 3, 2021. Retrieved from :<https://www.osapublishing.org/oe/abstract.cfm?uri=oe-25-15-18230> entire document.

Schindler, Stephanie, et al. Intensity standardisation of 7T MR images for intensity-based segmentation of the human hypothalamus PLOS One 12(3). 2017. Retrieved Sep. 3, 2021. Retrieved from Internet: <https://www.ncbi.nlm.nih.gov/pmc/articles/PMC5333904/pdf/pone.0173344.pdf>.

* cited by examiner

MICROWAVE IMAGING USING A RADIALLY-POLARIZED PROBE

BACKGROUND

Microwave and millimeter wave imaging techniques have been shown to have significant potential in a wide variety of applications, including biomedical, security, and nondestructive testing. Typically, microwave and millimeter wave imaging is performed by scanning a microwave probe on a two-dimensional (2-D) raster grid above an imaging area of interest containing target or targets to be detected, while maintaining the standoff (distance from the probe to the imaging area) constant. Standoff distance is an important parameter in microwave imaging applications, and usually splits the method into two categories: near-field imaging and far-field imaging. With far-field imaging in particular, synthetic aperture radar (SAR) algorithms become necessary to improve image resolution.

Near-field imaging is performed with the probe scanning the potential target or targets to be detected from a very close standoff distance. This type of imaging can provide very high sensitivity to small targets, but is also very sensitive to variations in standoff distance. For this reason, near-field imaging of this type is generally unsuitable for imaging areas that are not flat.

Far-field imaging typically involves scanning the area to be imaged with the probe positioned at a larger distance from the potential target or targets compared to near-field imaging. Because of the spreading of radiated electromagnetic waves as they propagate from the probe toward the imaging area, this scanning process is typically combined with SAR focusing algorithms (or other methods as necessary), such as the omega-k SAR algorithm, which are needed after the scan has been performed to focus the image to the depth of the area of interest. Far-field imaging is useful when the area of interest is not flat or when it is not practical to scan close to the potential targets.

An open-ended rectangular waveguide probe is known for use in near-field and far-field microwave and millimeter wave imaging. Independent of the standoff distance, this probe relies on irradiating a sample with a linearly-polarized electric field (i.e., the electric field vector points in a certain direction). As a result, the sensitivity of the probe to polarized targets (e.g., cracks, sharp edges, wire scatterers, etc.) depends on the relative orientation of the target with respect to the orientation of the probe's linearly polarized electric field. For example, it is well-established that such a probe is sensitive to a crack in metal, for instance, when the incident field vector is orthogonal to the length of the crack but not when the incident field vector is generally parallel to the length of the crack.

Because the orientation of the potential targets is often unknown before imaging, it is desired to have a probe that can detect targets and the like independent of the relative orientations of the target and the probe's field. One such probe is an open-ended coaxial probe, but it is only suitable for near-field imaging and is very sensitive to variations in the standoff distance of metal surfaces, and generally has limited utility and applications. Another such probe is a dual-polarized probe, which can be used to irradiate the sample with two orthogonal polarizations. Although the dual-polarized probe can detect arbitrarily oriented targets, it requires a two-channel measurement system and a highly complex calibration process.

SUMMARY

Aspects of the present disclosure involve microwave and millimeter wave imaging for detecting targets, such as cracks, sharp edges, wire scatterers, and other flaws or features of interest, independent of the target's orientation. Advantageously, the system can utilize a single channel measurement system. In operation, a radially-polarized probe images an area of interest at a predetermined standoff distance corresponding to a far-field and/or a near-field detection mode. The radially-polarized probe uses, for example, a K-band frequency that ranges from 18 to 26.5 GHz. Because the probe transmits a radially-polarized imaging signal, the irradiating signal's polarization orientation is optimal to detect any arbitrarily-oriented target at some point during the course of scanning. Thus, the target can be detected without regard to its orientation. And because the radially-polarized probe's polarization direction changes relative to the target orientation as the probe scans over the sample, an intensity associated with the target image is substantially constant, regardless of target orientation.

In an aspect, a microwave and millimeter wave imaging system for detecting a target in an imaging area includes a signal source generating an imaging signal. A radially-polarized probe coupled to the signal source is configured to irradiate the imaging area and receive any scattered signal resulting from any targets in the imaging area. The probe transmits the imaging signal having a radially-polarized pattern with an orientation independent of an orientation of a target in the sample. The imaging system also includes a measurement system coupled to the probe and configured to receive the reflected signal via the probe and generate an image of the sample based on the received signal, possibly using a SAR imaging algorithm. The measurement system detects the target in the image independent of orientation of the target.

In another aspect, a method of using a microwave and millimeter wave imaging system to detect a target in the imaging area includes transmitting an imaging signal from a radially-polarized probe at a standoff distance from a sample along a predetermined scan path relative to the sample. The imaging signal has a polarization orientation during scanning independent of an orientation of the target in the sample. The polarization orientation at each target in the sample changes during scanning as the probe transmits the imaging signal. The method further includes receiving, by a measurement system coupled to the radially-polarized probe, scattered waves reflected from the sample during scanning, generating an image of the sample including the target based on the reflected waves, and detecting the target in the image of the sample independent of the orientation of the target.

In yet another aspect, an imaging system includes a radially-polarized probe configured to transmit an imaging signal incident to a sample and receive reflected waves scattered by the sample. The imaging signal has a frequency in a range from about 300 MHz to about 300 GHz and the probe radially polarizes the transmitted imaging signal such that the imaging signal incident to the sample has a polarization orientation independent of an orientation of a target in the sample. The imaging system also includes a measurement system coupled to the probe and configured to receive the reflected waves from the probe via a single channel and generate an image of the sample based on the received reflected wave. The image of the sample indicates a detected target in the image independent of the orientation of the target.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
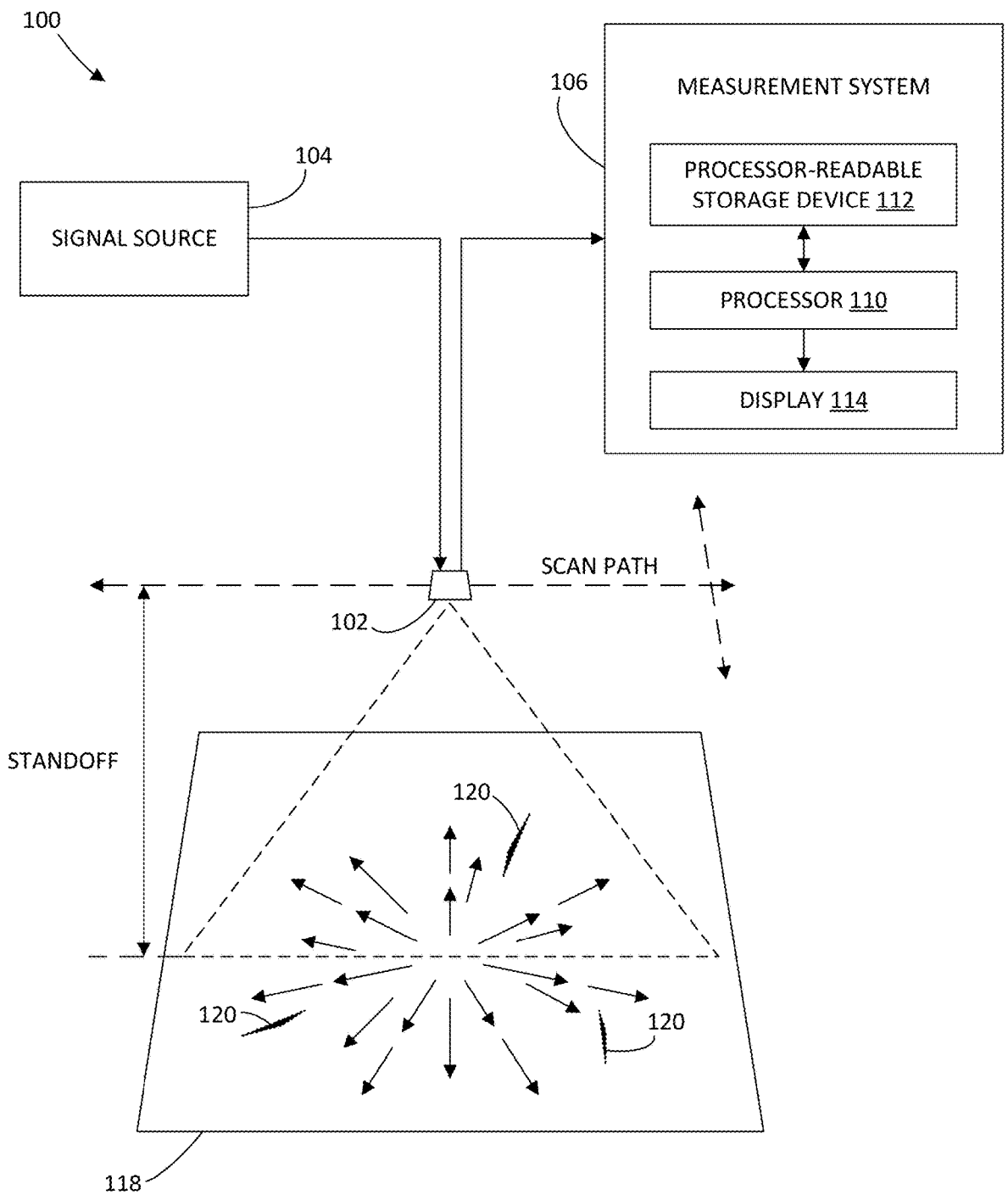
FIG. 1 is a diagram of a microwave or millimeter wave imaging system according to an embodiment.

Referring now to the drawings, FIG. 1 illustrates a microwave/millimeter wave imaging system 100 embodying aspects of the present disclosure. As shown, the system 100 includes a radially-polarized probe 102, a signal source 104, and a measurement system 106, which includes a processor 110, a processor-readable storage device 112, and a display 114. The signal source 104 is electrically and/or communicatively coupled to the probe 102. The probe 102 is also electrically and/or communicatively coupled to the measurement system 106 (e.g., via a coax-to-waveguide adapter). The processor 110 of the measurement system 106 is in turn electrically and/or communicatively coupled to the processor-readable storage device 112 and the display 114.

The probe 102 of the imaging system 100 scans an imaging area, referred to here as a sample 118, such as a metal structure or plate or other subject under test, to detect one or more targets 120 (e.g., cracks, sharp edges, wire scatterers, or other flaws or features of interest) either on the surface of or within the sample 118. The probe 102 is positioned remotely from sample 118 at a distance referred to as the standoff. The signal source 104 coupled to probe 102 generates an imaging signal having a frequency greater than or equal to 300 MHz and probe 102 transmits the imaging signal incident to sample 118 during scanning. In an embodiment, signal source 104 generates the imaging signal having a frequency in the range of about 300 MHz to about 300 GHz.

According to aspects of the present disclosure, signal source 104 is adapted to generate and provide a microwave signal to probe 102, which in turn is adapted to transmit microwave electromagnetic energy incident upon sample 118. In this manner, signal source 104 and probe 102 are adapted to irradiate/illuminate sample 118 with electromagnetic energy. In one form, the term microwave as used herein comprises microwave or millimeter wave electromagnetic energy having a frequency of ultra-high frequency or greater. For example, microwave electromagnetic energy includes electromagnetic energy having a frequency of about 300 megahertz (MHz) to about 300 gigahertz (GHz), which includes the K-band (e.g., 18-26.5 GHz) and/or the Ka-band (e.g., 26.5-40 GHz). In an embodiment, the transmitted microwave signal may be swept over a range of frequencies (e.g., a bandwidth greater than 0 Hz, a 25 GHz bandwidth, etc.).

The probe 102 comprises a radially-polarized probe positioned away from sample 118 at a predetermined standoff distance corresponding to a far-field detection mode and/or a near-field detection mode. Because probe 102 is polarized radially, the imaging signal incident to sample 118 has an electric field polarization that is oriented in all different directions at various locations around the sample. This is illustrated diagrammatically in FIG. 1, which shows an example radially-polarized pattern of a radially-polarized probe operating in the far-field of sample 118. In a conventional scan using a linearly-polarized probe, the polarization direction stays constant as the probe scans over the sample. In contrast, the relative polarization orientation in FIG. 1 at each target 120 changes as probe 102 scans over sample 118. Because the orientation is substantially orthogonal to the length of each flaw (i.e., target 120) at some point during the scan, each flaw is detected regardless of its orientation relative to probe 102. In an embodiment, radially-polarized probe 102 comprises an open-ended circular waveguide fed through a coaxial connector to excite the TM01 mode of the waveguide. In another embodiment, radially-polarized probe 102 comprises an open-ended square waveguide likewise fed through a coaxial connector to excite the TM01 mode of the waveguide. In yet another embodiment, propagation in probe 102 is in the TE11 mode. One having ordinary skill in the art will understand that radially-polarized probes having varying EM characteristics and geometries, which offer measurement flexibility, are within the scope of the present disclosure.

The probe 102 is also adapted to receive (e.g., sample) an electromagnetic signal reflected from sample 118 that includes the electromagnetic energy of the transmitted electromagnetic imaging signal. The system 100 images sample 118 to detect targets 120 independent of their orientation relative to the probe's orientation. Imaging is performed by scanning probe 102 on a 2-D raster grid or other predetermined scanning pattern above the sample 118 to be inspected. In an embodiment, the standoff remains constant during scanning. Unlike a dual-polarized probe, the radially-polarized probe 102 can utilize a single channel measurement system 106. The measurement system 106, which is coupled to radially-polarized probe 102, receives scattered waves reflected from sample 118 during scanning via a single channel and generates an image of sample 118, including targets 120, based on the reflected waves, possibly through the use of a SAR imaging algorithm. The measurement system 106 is further configured to detect targets 120 in the image of sample 118 independent of the orientation of each target 120. In other words, measurement system 106 can detect targets 120 independent of their orientations because the imaging signal has many polarization orientations rather than a single polarization orientation.

The measurement system 106 is adapted to measure parameters (e.g., network parameters, scattering parameters, etc.) of the electrical network formed by signal source 104, probe 102, and sample 118 (e.g., transmission and reflection of electromagnetic signals). In an embodiment, measurement system 106 measures both amplitude and phase properties. For example, measurement system 106 may comprise a vector network analyzer (VNA), a vector reflectometer, and/or a coherent reflectometer for measuring a complex reflection coefficient (e.g., amplitude and phase). In another embodiment, measurement system 106 measures amplitude properties only. For example, measurement system 106 may comprise a scalar network analyzer for measuring a real reflection coefficient (e.g., amplitude only). The measurement system 106 may also be referred to as a measuring instrument in accordance with one or more embodiments of the disclosure. In an embodiment, signal source 108, measurement system 106, processor 110, processor-readable storage device 112, and display 114 comprise a single measurement device/instrument, such as a VNA. Additionally or alternatively, probe 102 and measurement system 106 may comprise a single measurement device/instrument, in accordance with one or more embodiments of the disclosure.

The processor 110 is adapted to execute processor-executable instructions stored on processor-readable storage device 112 to obtain an electromagnetic signature of sample 118 and to generate an image from the obtained signature, possibly using a SAR imaging algorithm.

Figures 2A, 2B, 2C:
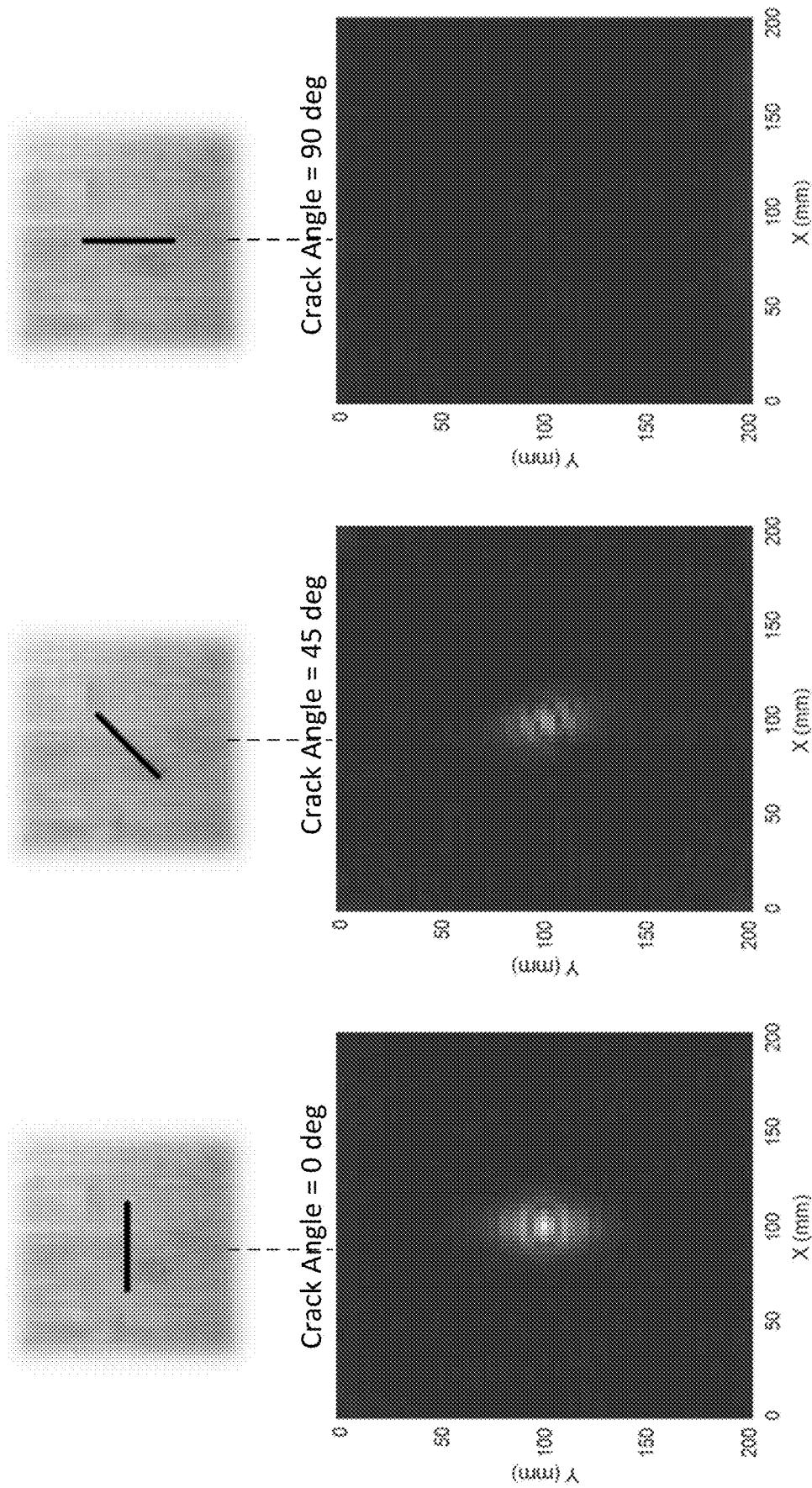
FIGS. 2A-2C illustrate images of a metal plate having a crack at different orientations made using a linearly polarized probe.

FIGS. 2A-2F illustrate examples of images generated by scanning a metal plate to detect a target using far-field imaging. In the illustrated embodiment, the target is a surface breaking crack. FIGS. 2A, 2B, and 2C show images of an 8 mm long surface breaking crack in a metal plate using a K-band (18-26.5 GHz) open-ended rectangular waveguide probe. In this instance, the open-ended rectangular waveguide probe has linear polarization. Moreover, the crack scatters only the linear component of the polarization that is perpendicular to the length of the crack. The images of the metal plate shown in FIGS. 2A-2C were generated by scanning the probe in a 2-D raster grid above the plate with a standoff distance of 80 mm. In the illustrated example, each of the images of FIGS. 2A-2C were formed using a wideband synthetic aperture radar (SAR) algorithm. A comparison of FIG. 2A, FIG. 2B, and FIG. 2C reveals that the crack's orientation dramatically affects the intensity associated with the crack image (or indication).

Figure 2D:
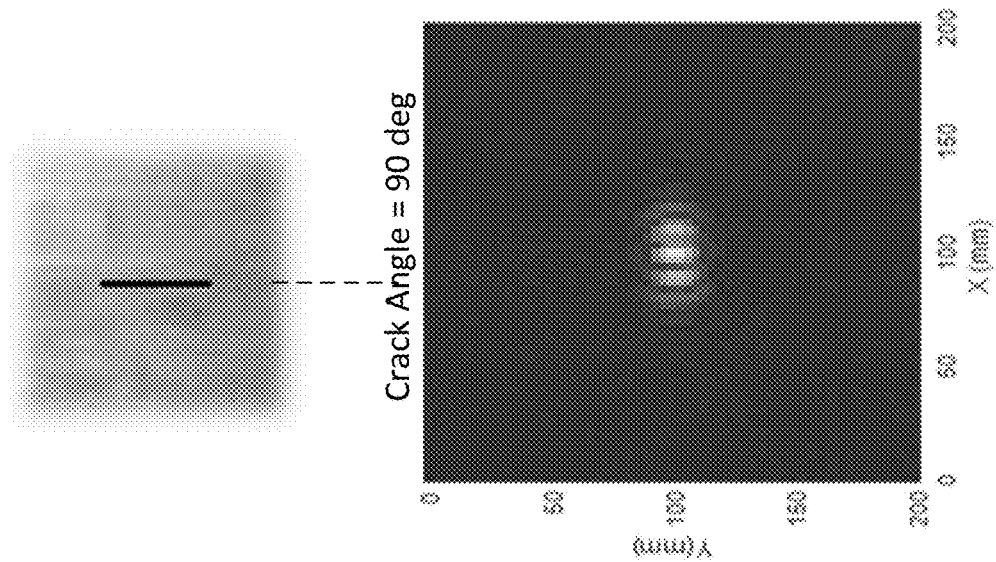
FIGS. 2D-2F illustrate images of a metal plate having a crack at different orientations made using a radially-polarized probe according to an embodiment.
Figure 2E:
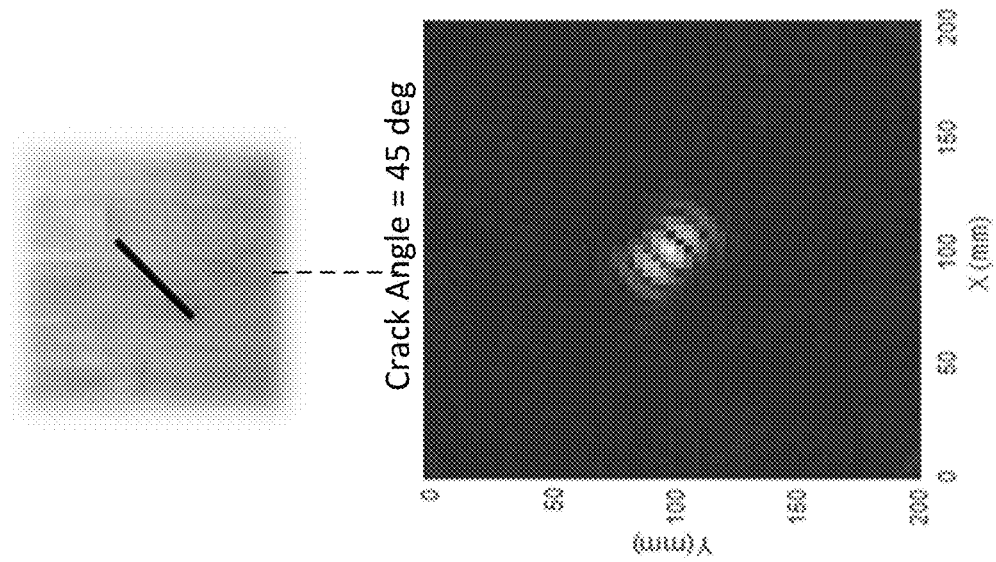
Figure 2F:
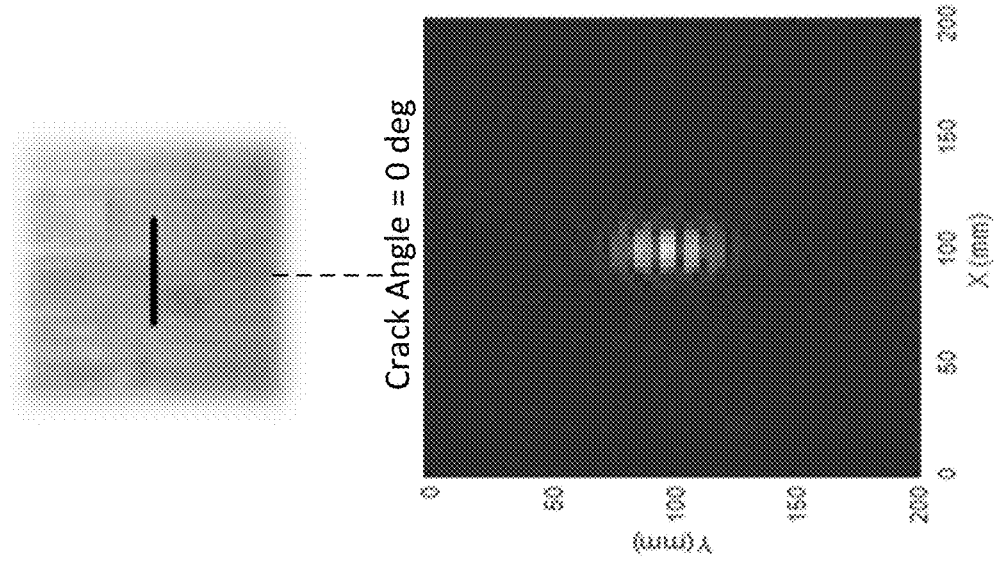

On the other hand, FIGS. 2D, 2E, and 2F show images of an 8 mm long surface breaking crack (i.e., target 120) in a metal plate (i.e., sample 118) using a K-band (18-26.5 GHz) radially-polarized waveguide probe 102. The measurement system 106 generates an image of sample 118 by scanning probe 102 in a 2-D raster grid above sample 118 with a standoff distance of 80 mm, similar to the diagram of FIG. 1. In contrast to FIGS. 2A-2C, FIGS. 2D-2F show similar images the intensity associated with the crack image (or indication) is constant independent of the crack's crack orientation.

Figure 3B:
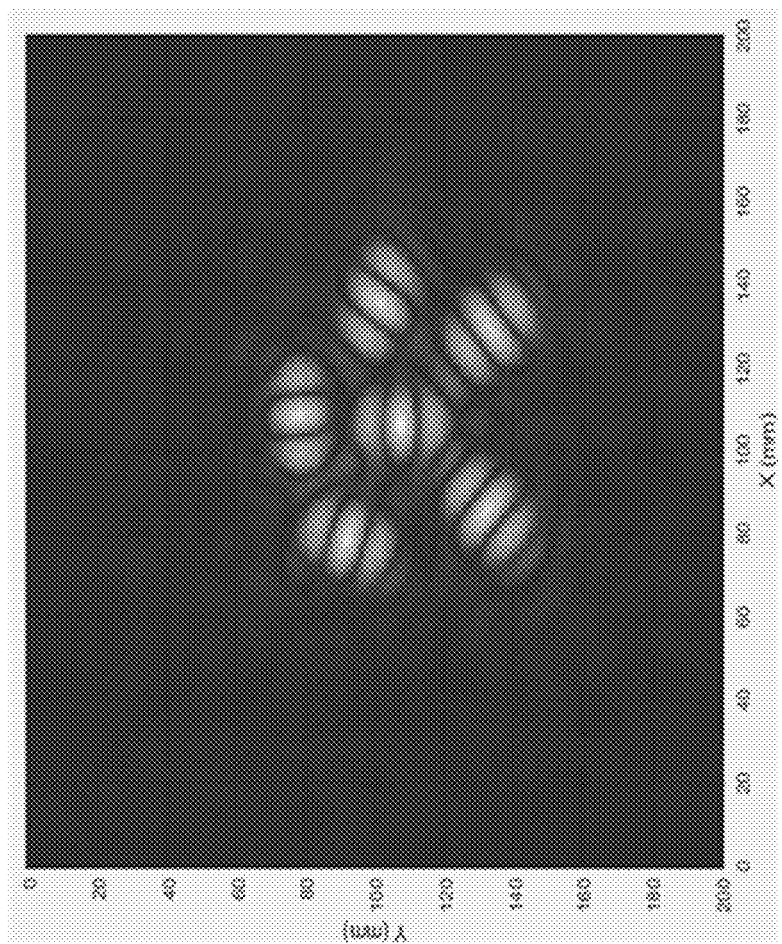
FIG. 3A illustrates a foam sample on which 6 metal wires are placed and FIG. 3B illustrates a SAR image of the foam sample made using a radially-polarized probe according to an embodiment.
Figure 3A:
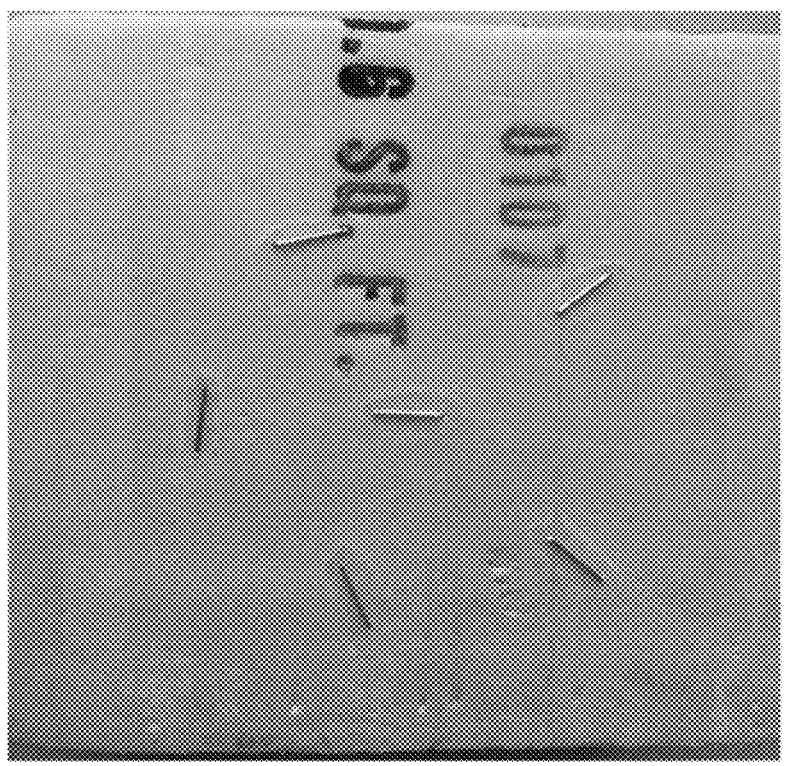
Figure 4A:
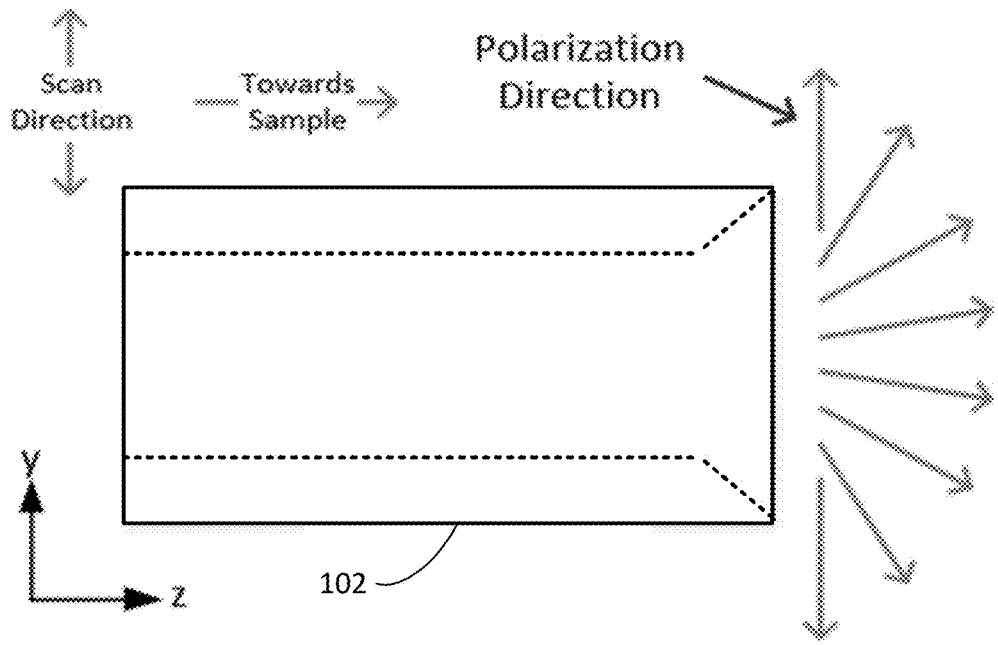
FIGS. 4A and 4B are side view and front view diagrams, respectively, showing a near-field polarization distribution of a radially-polarized probe according to an embodiment.
Figure 4B:
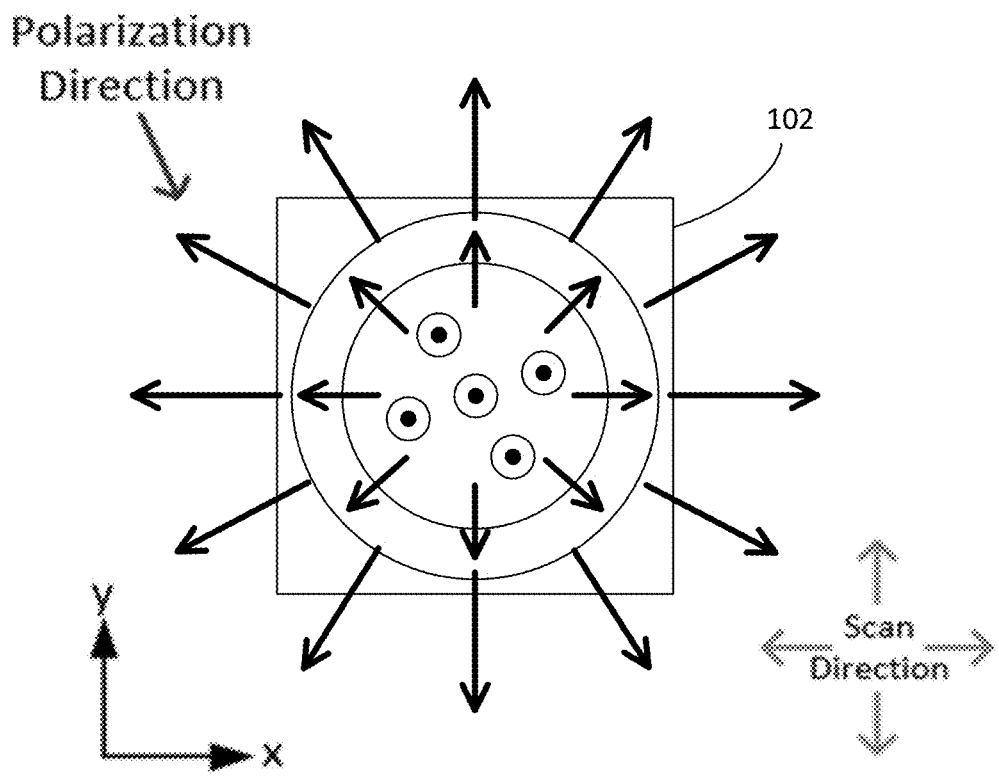

Referring now to FIGS. 3A and 3B, one advantage of the improved microwave and millimeter wave imaging system 100 embodying aspects of the present disclosure is that the imaging method can be applied to detect targets 120 having any orientation. For example, FIG. 4A shows six 22 AWG copper wires each having a length of 8 mm placed at various orientations on a foam block sample. The foam in this sample 118 has properties very similar to air, and has a negligible effect on the resulting image. FIG. 4B shows a SAR image made using radially-polarized probe 102 operating in at K-band frequencies (18-26.5 GHz) to scan sample 118 at a standoff distance of 80 mm. The image of FIG. 3B generated by measurement system 106 clearly shows that the indications of targets 120 in the image are the same intensity for all wire orientations, which cannot be achieved by a linearly-polarized probe.

A further advantage of the improved microwave and millimeter wave imaging system 100 embodying aspects of the present disclosure is that near-field imaging (e.g., at a standoff of 5 mm) utilizing the radially-polarized probe 102 also detects targets 120 independent of their orientation relative to sample 118 and probe 102. When the radially-polarized probe 102 is used in the near-field, the diversity of detected target polarizations increases beyond that of the target polarizations detected by either linear or dual-polarized probes. For a raster scan grid on the xy-plane, FIGS. 4A and 4B show the polarization pattern of the radially-polarized probe 102 in the near-field, where the polarization points in the x-direction, y-direction, and z-direction at various locations around probe 102. The arrows show the direction of the polarization of the imaging signal at various locations around probe 102. Because the electric field polarization is in the z-direction near probe 102, this imaging method enables detection of targets 120 that are polarized in the z-direction as well as targets 120 polarized in the x-direction or y-direction.

Figures 5A, 5B:
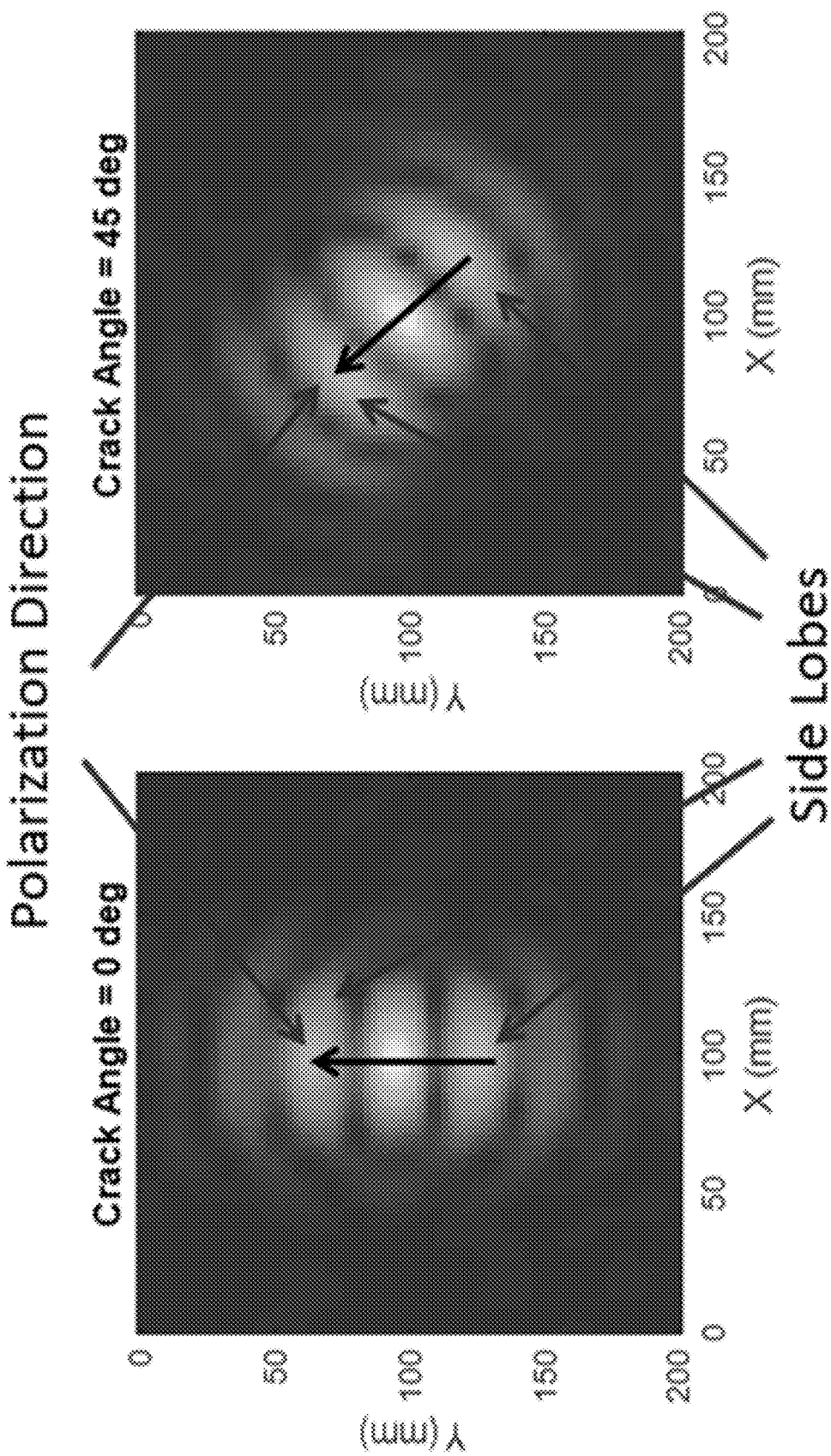
FIGS. 5A and 5B illustrate SAR images of a crack in metal using a radially-polarized probe where the crack is oriented at an angle of 0 degrees in FIG. 5A and 45 degrees in FIG. 5B according to an embodiment.

Advantageously, aspects of the present disclosure, by using a radially-polarized probe, gives us the ability to determine the orientation of any detected target. The radially-polarized probe 102 determines the target's orientation by locating two side lobes on either side of an indication of a polarized target 120 in the image; the direction of the linear polarization optimally scattered by the target is in the direction of a line between the two side lobes. FIGS. 5A and 5B, are zoomed in versions of the far-field images of FIGS. 2D and 2E, respectively. The arrows indicate the polarization of the target 120. For any indication of a polarizing target 120 in the image, there are side lobes on either side of the indication. These side lobes are a characteristic of the polarization pattern exhibited by the radially-polarized probe 102, and direction of the scattered polarization of the target 120 is in the direction of a line (shown by the arrows) between the two side lobes. As a result, imaging system 100 provides a direct method of finding the orientation of target 120. Images created in the near-field have similar side-lobes and, thus, the same method can be used for identifying target orientation in near-field imaging.

In operation, the radially-polarized probe 102 transmits the imaging signal from a standoff distance along a predetermined scan path relative to the sample 118. The imaging signal has a polarization pattern during scanning independent of an orientation of the target 120 in the sample 118. The polarization orientation incident on each target 120 in the sample 118 changes during scanning as the probe 102 moves along the scan path. The measurement system 106 coupled to the radially-polarized probe 102 receives the scattered waves reflected from the sample 118 during scanning, generates an image of the sample 118 including the target 120 based on the reflected waves and possibly using a SAR imaging algorithm, and detects the target 120 in the image of the sample independent of the orientation of the target 120.

Figure 6:
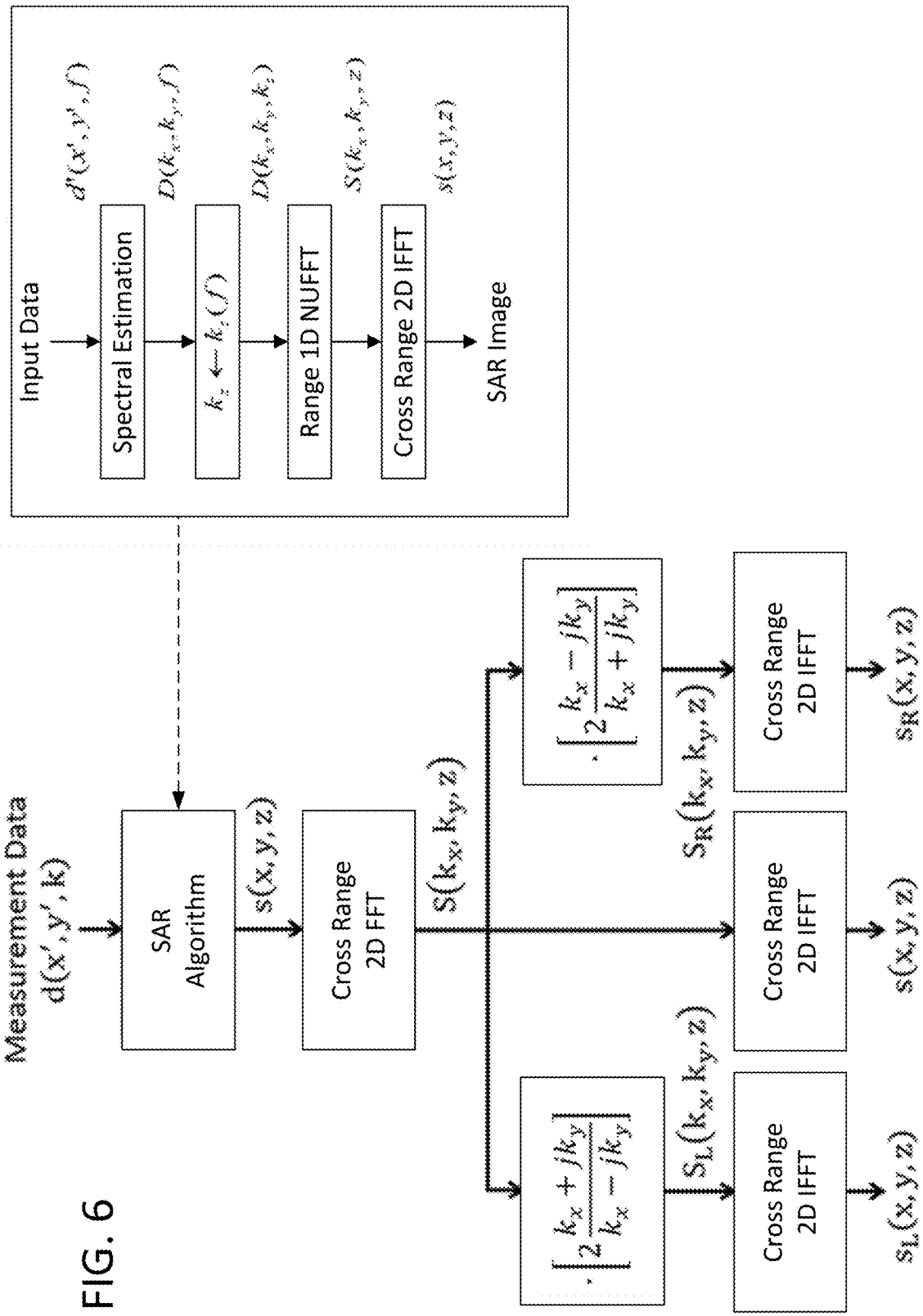
FIG. 6 is a flow diagram showing an example process of generating images from the data recorded by an imaging system utilizing a radially-polarized probe according to an embodiment.

Advantageously, using a radially-polarized probe, provides the ability to determine the orientation and degree of polarization of any detected target (i.e., how well and in what direction the target 120 polarizes the incident signal). FIG. 6 is a flow diagram showing an example process of generating images from the data recorded by imaging system 100 utilizing radially-polarized probe 102 according to an embodiment. In the example process outlined in FIG. 6, the recorded measured signal over the course of the scan is first processed using a SAR imaging algorithm and then processed to create a total of three complex-valued images. In an embodiment, the three complex-valued images are then used in the equations below to calculate the target orientation (Eq. 1) and target degree of polarization (Eq. 4) at the location of any detected targets 120. Target orientation is the orientation of the linearly-polarized electric field that is maximally scattered by the target 120, and target degree of polarization is the degree to which the target 120 polarizes the irradiating signal.

The equations below may be used for calculating properties of the detected targets 120 using the images created by the process of FIG. 6.

$$\theta_t(x, y, z) = \frac{1}{2}\arg\left(\frac{s_L(x, y, z)}{s(x, y, z)}\sqrt{\frac{s^2(x, y, z)}{s_L(x, y, z)s_R(x, y, z)}}\right) \quad \text{(Eq. 1)}$$

$$\Gamma_p(x, y, z) = 2s_L(x, y, z)e^{-j2\theta_t(x,y,z)} \quad \text{(Eq. 2)}$$

$$\Gamma_n(x, y, z) = s(x, y, z) - \frac{1}{2}\Gamma_p(x, y, z) \quad \text{(Eq. 3)}$$

$$P_d(x, y, z) = \frac{|\Gamma_p(x, y, z)|}{|\Gamma_n(x, y, z)| + |\Gamma_p(x, y, z)|} \quad \text{(Eq. 4)}$$

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A microwave and millimeter wave imaging system for detecting a target in a sample, the system comprising:
   a signal source generating an imaging signal, the imaging signal having a frequency at a microwave frequency or a millimeter wave frequency;
   a radially-polarized probe coupled to the signal source and configured to transmit the imaging signal incident to a sample and receive a reflected signal therefrom for imaging the sample, wherein the probe transmits the imaging signal having a radially-polarized pattern and wherein the radially-polarized pattern of the transmitted imaging signal has an orientation independent of an orientation of a target in the sample; and
   a measurement system coupled to the probe and configured to receive the reflected signal from the probe via a single channel and generate an image of the sample based on the reflected signal, wherein the measurement system detects the target in the image independent of the target orientation.

2. The system of claim 1, wherein the frequency of the imaging signal comprises a K-band frequency in a range from 18 GHz to 26.5 GHz.

3. The system of claim 2, wherein a detected target within the image of the sample has generally equal intensity at different target orientations.

4. The system of claim 2, wherein the radially-polarized probe operates at a standoff distance of approximately 5 mm to approximately 80 mm from the sample.

5. The system of claim 1, wherein the radially-polarized pattern of the imaging signal transmitted by the probe is such that the imaging signal incident on the target is optimally orientated to detect the target at one or more different positions during scanning of the sample by the probe.

6. The system of claim 1, wherein the polarization orientation of the imaging signal transmitted by the probe incident on the target changes as the probe scans over the sample and wherein an intensity associated with the target in the image of the sample is substantially constant regardless of the orientation of the target.

7. The system of claim 1, wherein the measurement system is configured to detect the target when the radial polarization orientation of the imaging signal is orthogonal relative to the orientation of the target.

8. The system of claim 1, wherein the measurement system is configured to execute image processing algorithms for determining the orientation of the target from the image of the sample.

9. The system of claim 1, wherein the radially-polarized probe comprises an open-ended waveguide fed through a coaxial connector to excite a TM01 mode of the waveguide.

10. A method of using a microwave and millimeter wave imaging system to detect a target in a sample, the method comprising:
    at a standoff distance from a sample, transmitting an imaging signal from a radially-polarized probe along a predetermined scan path relative to the sample, the imaging signal transmitted by the radially-polarized probe having a frequency at a microwave frequency or a millimeter wave frequency and a radially-polarized pattern such that the polarization orientation of the transmitted imaging signal incident at each target in the sample changes during scanning as the probe moves along the scan path and transmits the imaging signal;
    receiving, by a measurement system coupled to the radially-polarized probe, scattered waves reflected from the sample during scanning;
    generating, by the measurement system, an image of the sample including the target based on the reflected waves; and
    detecting the target in the image of the sample, the target being detected in the image independent of the orientation of the target.

11. The method of claim 10, wherein the frequency of the imaging signal comprises a K-band frequency in a range from 18 GHz to 26.5 GHz.

12. The method of claim 11, wherein a detected target within the image of the sample has generally equal intensity at different target orientations.

13. The method of claim 11, wherein generating the image comprises executing one or more synthetic aperture radar algorithms.

14. The method of claim 10, wherein transmitting the imaging signal comprises transmitting imaging signal from the probe having a radially-polarized pattern incident on the target that is optimally oriented to detect the target at one or more different positions during scanning of the sample by the probe.

15. The method of claim 10, wherein transmitting the imaging signal comprises changing a direction of the polarization orientation of the imaging signal as the probe scans over the sample and wherein an intensity associated with the target in the image of the sample is substantially constant regardless of the orientation of the target.

16. The method of claim 10, wherein detecting the target comprises detecting the target, by the single channel measurement system, when the polarization orientation of the imaging signal is orthogonal relative to the orientation of the target.

17. The method of claim 10, further comprising determining the orientation of the target from the image of the sample by:

locating two side lobes on either side of a detected target in the image; and indicating a direction of a line between the two side lobes.

18. The method of claim 10, wherein the radially-polarized probe comprises an open-ended waveguide fed through a coaxial connector to excite a TM01 mode of the waveguide.

19. An imaging system comprising:

a radially-polarized probe configured to transmit an imaging signal incident to a sample and receive reflected waves scattered by the sample, the imaging signal having a frequency in a range from about 300 MHz to about 300 GHz, the probe radially polarizing the transmitted imaging signal such that the imaging signal incident to the sample has a radially-polarized pattern independent of an orientation of a target in the sample; and a measurement system coupled to the probe and configured to receive the reflected waves from the probe via a single channel and generate an image of the sample based thereon, wherein the image of the sample indicates a detected target in the image independent of the orientation of the target.

20. The system of claim 19, wherein the radially-polarized probe comprises an open-ended waveguide and operates at a standoff distance in a range of about 5 mm to about 80 mm from the sample.

\* \* \* \* \*